United States Patent [19]
Treibitz et al.

[11] Patent Number: 6,091,408
[45] Date of Patent: Jul. 18, 2000

[54] METHOD FOR PRESENTING INFORMATION UNITS ON MULTIPLE PRESENTATION UNITS

[75] Inventors: Alan Treibitz, Castle Rock; Frederick C. Hill, Parker, both of Colo.

[73] Assignee: Z-Axis Corporation, Greenwood Village, Colo.

[21] Appl. No.: 08/910,909

[22] Filed: Aug. 13, 1997

Related U.S. Application Data

[60] Provisional application No. 60/023,415, Aug. 13, 1996.

[51] Int. Cl.[7] .................................................. G06F 3/00
[52] U.S. Cl. ........................................ 345/329; 345/349
[58] Field of Search ........................... 345/115, 326–358, 345/2

[56] References Cited

U.S. PATENT DOCUMENTS

| | | | |
|---|---|---|---|
| 4,510,619 | 4/1985 | LeBrun et al. | 382/57 |
| 4,876,657 | 10/1989 | Saito et al. | 345/329 X |
| 5,109,482 | 4/1992 | Bohrman | 395/154 |
| 5,164,899 | 11/1992 | Sobotka et al. | 364/419 |
| 5,181,162 | 1/1993 | Smith et al. | 364/419 |
| 5,204,768 | 4/1993 | Tsakiris et al. | 345/329 X |
| 5,280,574 | 1/1994 | Mizuta et al. | 395/146 |
| 5,379,423 | 1/1995 | Mutoh et al. | 395/600 |
| 5,451,998 | 9/1995 | Hamrick | 348/13 |
| 5,455,910 | 10/1995 | Johnson et al. | 345/329 X |
| 5,473,744 | 12/1995 | Allen et al. | 395/154 |
| 5,606,344 | 2/1997 | Blaskey et al. | 345/115 |
| 5,634,018 | 5/1997 | Tanikoshi et al. | 345/329 |
| 5,736,968 | 4/1998 | Tsakiris | 345/326 X |
| 5,758,079 | 5/1998 | Ludwig et al. | 345/330 X |
| 5,767,897 | 6/1998 | Howell | 345/329 X |
| 5,822,525 | 10/1998 | Tafoya et al. | 345/331 X |

OTHER PUBLICATIONS

Cowart, "Mastering WINDOWS 3.1", Sybex, pp. 28–30, 1993.

*Primary Examiner*—John Breene
*Attorney, Agent, or Firm*—Schwegman, Lundberg, Woessner & Kluth, P.A.

[57] ABSTRACT

A system for organizing and presenting information includes one or more computers connected in a network with a touch screen controlling the display of images on one or more other displays. In a courtroom setting, the touch screen is located at a podium with a presenting attorney, and the one or more other displays are positioned to be viewed by a judge or jury. Presentations are built by selecting names of images from a list, viewing a plurality of thumbnail representations of those images, and selecting images for a presentation from the thumbnail representations. The touch-screen display at the podium allows the presenting attorney to preview images before they are displayed on the one or more other displays.

4 Claims, 10 Drawing Sheets

Microfiche Appendix Included
(5 Microfiche, 475 Pages)

METHOD FOR PRESENTING INFORMATION UNITS ON MULTIPLE PRESENTATION UNITS

CONTINUATION DATA

This application is a continuation-in-part and claimed benefit under 35 U.S.C. § 119(e) of U.S. Provisional application Ser. No. 60/023,415, filed Aug. 13, 1996. Pending, the entire disclosure of which is hereby incorporated herein by reference.

TECHNICAL FIELD OF THE INVENTION

The present invention relates in general to methods for managing information such as documents, photographs, graphics, and video. Particularly, the present invention relates to a system for storing and cataloging information and creating, storing and showing presentations of the cataloged information.

MICROFICHE APPENDIX

Included herewith are microfiche appendices (labeled Fiche 0001-0005) of the source code of an embodiment of the present invention. The source code is written in Borland International Delphi 3.0, and can be executed on Windows 95 or Windows NT4.0.

BACKGROUND OF THE INVENTION

In recent years, the capability to convert physical documents into electronic formats has become relatively inexpensive and widely available. Consequently, the field of document imaging has grown significantly. Some examples of these documents are traditional paper documents, photographs, blueprints, drawings and graphics. These are commonly converted to and stored in computer files as images. Using character recognition software, documents that include text may also be converted to text files.

In addition to images converted to electronic formats, many documents or other types of information, such as word-processed documents, computer-generated graphics or drawings, and on-line images, are created electronically. Moving images such as video, animation or film and aural media such as music, narrations or sounds may also be created electronically or converted from traditional to electronic formats and stored as computer files.

Some of these electronically stored materials, such as photographs, drawings and scanned documents, are commonly considered images. Others, such as video, audio or text, may not traditionally be thought of as images. Herein, any of these electronically stored materials may be referred to as information units. The electronic storage of hundreds, thousands, or even millions, of such information units is now possible on personal computers.

As the potential volume of available information units increases, a system for managing these units becomes essential. Such a system must enable a user to easily and quickly identify, locate, access, view or hear a particular information unit when needed.

Electronic document management systems currently exist that maintain searchable databases of information about document images and allow users to utilize these images. Some of these systems also associate the text content with the images to enable searches to be performed on the text of the documents. These systems are most commonly used for research on document populations.

The computer-based presentation field has also grown in recent years. The acceptance and use of such electronic presentation software as Microsoft's "PowerPoint" and Aldus' "Persuasion" demonstrate the need to create professional looking presentations. These systems are generally designed to allow users to create graphical presentations using text and images. Although some such systems allow for importing of external images, video or sound, they do not assist in the organization of those materials; thus, the user is responsible for managing the computer files associated with the material. In addition, the amount of time required to produce a single image is often significant.

Other presentation systems exist which are designed to present electronically stored images, video or audio. Two such systems are those provided by InVzn and Trial Presentation Technologies. These systems employ the use of bar codes or alphanumeric codes that are correlated with the stored images, video or audio. Such systems use the barcodes or alphanumeric codes to access or present the needed material. Within systems of this type, each bar code or alphanumeric code with its associated material is essentially independent. Most such systems allow users to assign attributes to images by zooming or cropping and to enhance images by adding graphical or text overlays.

Additional features of some of these systems allow an operator to create a script file outside the system that is used to build and present a sequence of images. In complex presentation environments, such as in a courtroom, hundreds of such script files may be needed over the course of a trial. Because of the complexity of these systems, many of them are best operated by technicians. The technician adds the enhancements to the images, creates the scripts, and runs the scripts when the presentations are displayed. The cost of utilizing a technician can be quite substantial and the time required to create a presentation sequence can be significant. In addition, since the names of these script files must be typed into the computer to begin a presentation, typos can cause unwanted delays or the presentation of the wrong scripts.

Most of these systems only allow the presenter to see precisely what the audience is seeing. Thus, the presenter must rely upon an outside reference, such as a notepad, to know what the next item presented will be. In some systems, the presenter may be provided with a mechanical or electronic switch that allows the audience display(s) to be blanked or turned off. In this type of system the presenter may then advance the presentation to the next image or revert to the previous image to view it before switching the audience display(s) back on. The presenter is still limited to stepping forward or backward one image at a time and the audience is required to watch a blank screen while waiting.

There remain several needs that are not addressed by these systems. When a large volume of information units is required, having thousands or millions of bar codes can be cumbersome at best. In many of today's presentation environments, speed and flexibility are critical. A presenter needs to be able to generate sequential presentations very quickly. Upon presenting, a presenter requires the flexibility to change the order or access many different presentations or information units within presentations without disturbing the communications process by blanking the audience display.

SUMMARY OF THE INVENTION

The present invention provides a method and apparatus for organizing and displaying a set of information units which may be still images, video, audio or other media. According to the method of image display, the invention provides a first display positioned to be viewed by a person controlling the display of images on a second display, with the second display positioned to be viewed by an audience. The method provides for displaying on the first display a first image from the set, wherein the first image is a candidate to be displayed on the second display. If desired it is selected to be displayed on the second display. At the same time, there is displayed on the first display a second image from the set of images which is a candidate to be displayed on the second display and if desired it too is selected to be displayed on the second display. The second image is then displayed on the second display if it is selected for display, wherein the first image is replaced substantially simultaneously by the second image. The method is carried under the control of one or more computers.

According to another embodiment of the invention, a first display is positioned to be viewed by a person controlling the display of images on a second display, with the second display positioned to be viewed by an audience. The method provides for displaying on the first display a list of words, symbols or images representing respective information units, and providing that such words, symbols or images may be selected by a user in order to preview one of the images on the first display. If desired, a previewed image may be selected by a user and displayed on the second display.

According to the apparatus of the invention, a software system is provided to carry out the above-described methods on one or more computers controlling the images on the first and second displays.

These and other methods and apparatus of the invention are described below.

DETAILED DESCRIPTION OF THE INVENTION

In the following detailed description of the preferred embodiments, reference is made to the accompanying drawings that form a part hereof, and in which are shown, by way of illustration, specific embodiments in which the invention may be practiced. It is understood that other embodiments may be utilized and structural changes may be made without departing from the scope of the present invention.

The present invention includes a software system and apparatus for organizing, managing and developing presentations of all types of information units for use in general business, legal and educational settings. Information units include but are not limited to still images, video images, text documents, or audio. In general business settings, it is intended for use by executives, management and clerical staff. In legal settings, it is intended for use by attorneys, paralegals, litigation support personnel and clerical staff. In educational settings, it is intended for use by educators, administrators and clerical staff.

Figure 1:
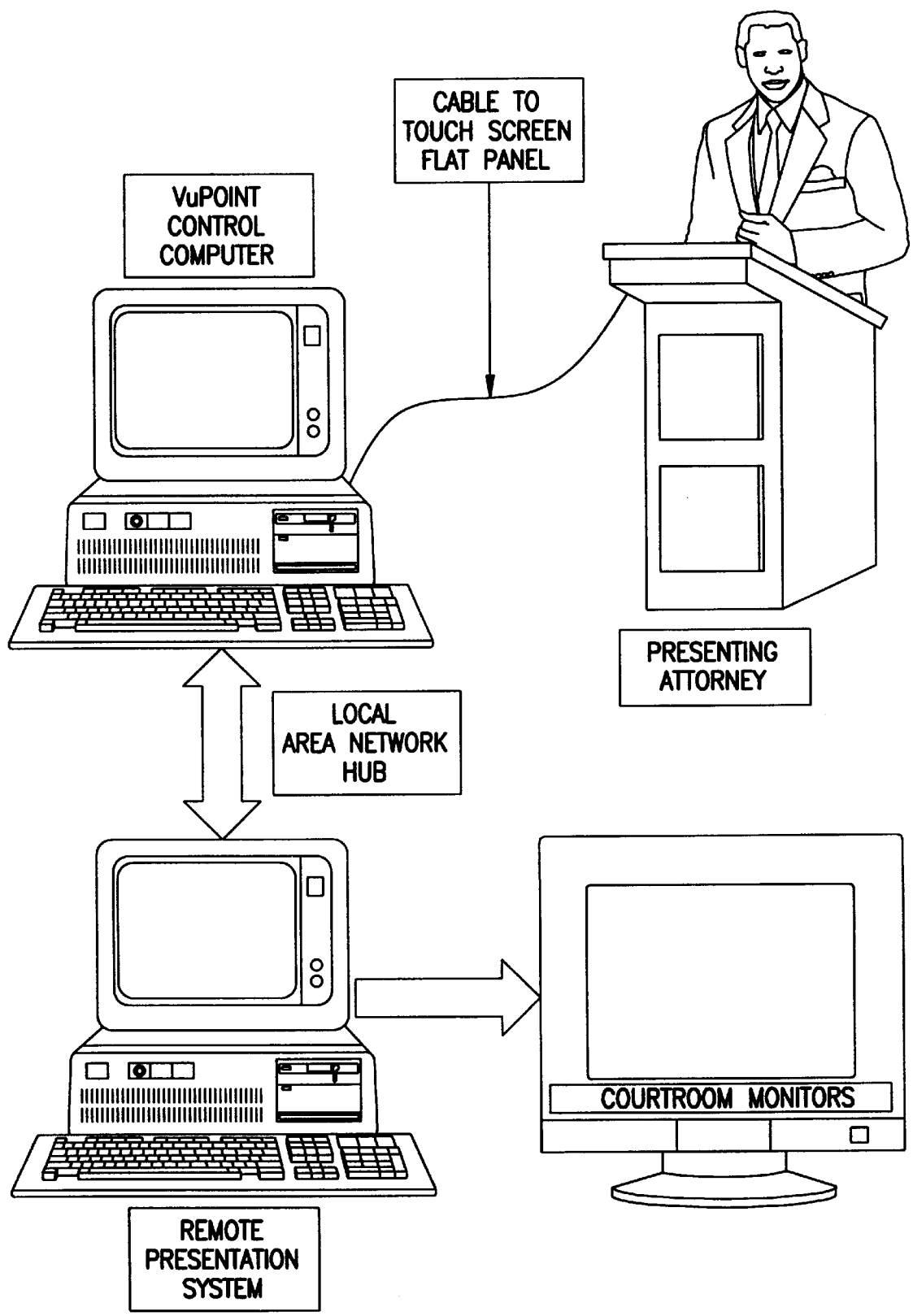
FIGS. 1 and 2 are schematic overviews of the system configuration of an embodiment of the present invention.
Figure 2:
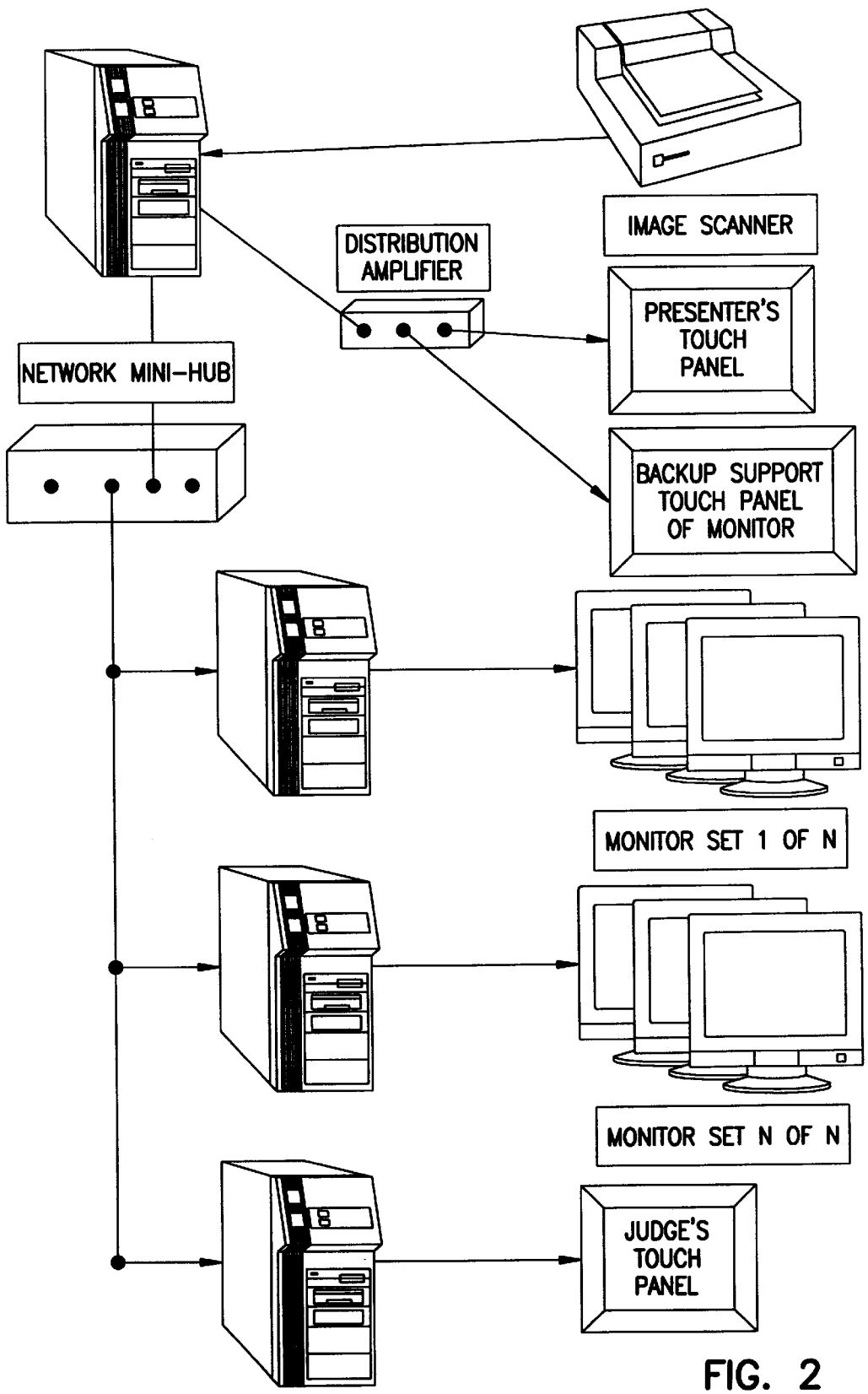
Figure 9:
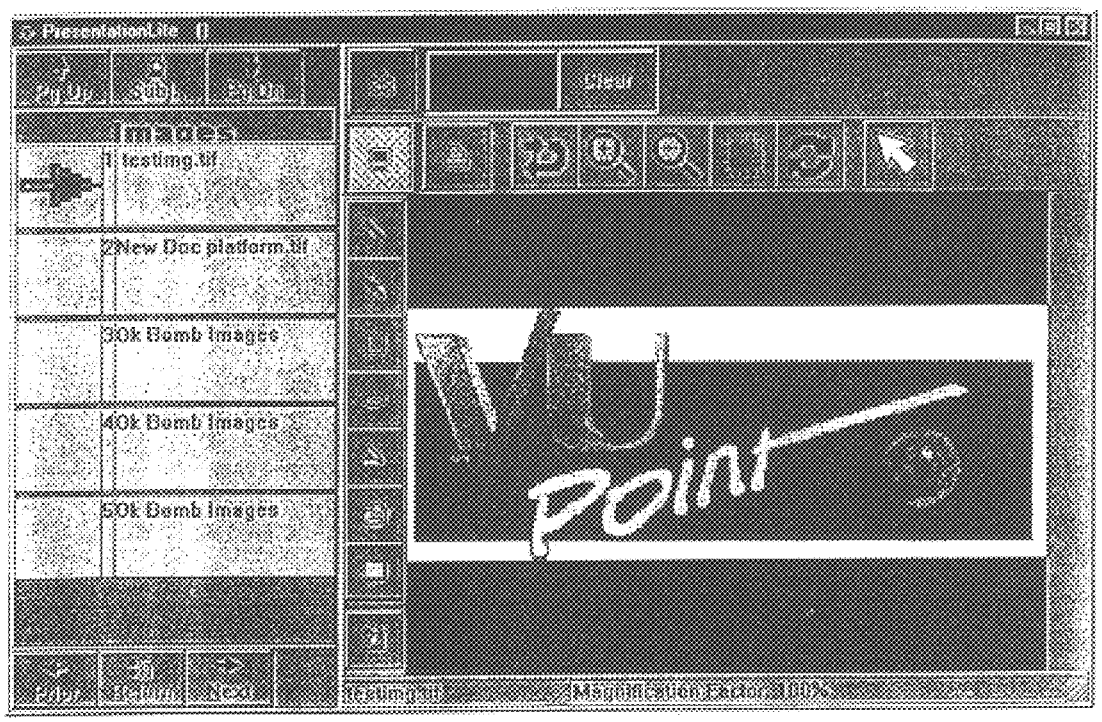
FIG. 9 shows the touchscreen screen of the VuPoint® embodiment of the present invention.

FIGS. 1 and 2 illustrate an embodiment of the invention marketed under the trademark VuPoint® by the assignee hereof. FIG. 1 illustrates the use of the system in a courtroom, wherein a presenting attorney controls display of information units from a control display proximate to the attorney while he or she makes her presentation to the court. A control computer receives instructions from the control display (preferably with a user interface as shown in FIG. 9), and passes instructions over a local area network to a remote presentation system computer (or computers) which drives one or more courtroom displays. Images to be displayed on the courtroom displays, which may be positioned in front of a judge or jury, can be stored locally on the remote presentation system computer(s) prior to the time they are selected for viewing, or can be sent to the remote presentation system computer just prior to their display. As illustrated herein, the invention is described with respect to displays that are positioned in various places in the setting in which the invention is used. However, the invention is not limited to the use of displays but to other devices for communicating with an audience including, but not limited to, overhead projectors, or sound systems and animatronics. These devices are referred to herein generically as presentation units.

FIG. 2 illustrates the computer network architecture of the system of FIG. 1 in more detail. FIG. 2 shows the control computer networked with several remote presentation system computers, two of which drive one or more monitors, and the other of which is connected to a touch panel display positioned at the judge's bench. An image scanner can be used to input documents to the control computer, which can also be used to build presentations. The control computer can receive inputs from both the attorney's or "presenter's" touch panel and a backup support touch panel monitor, thereby allowing either touch panel to provide input to the control computer and control the display of information units.

Figure 3:
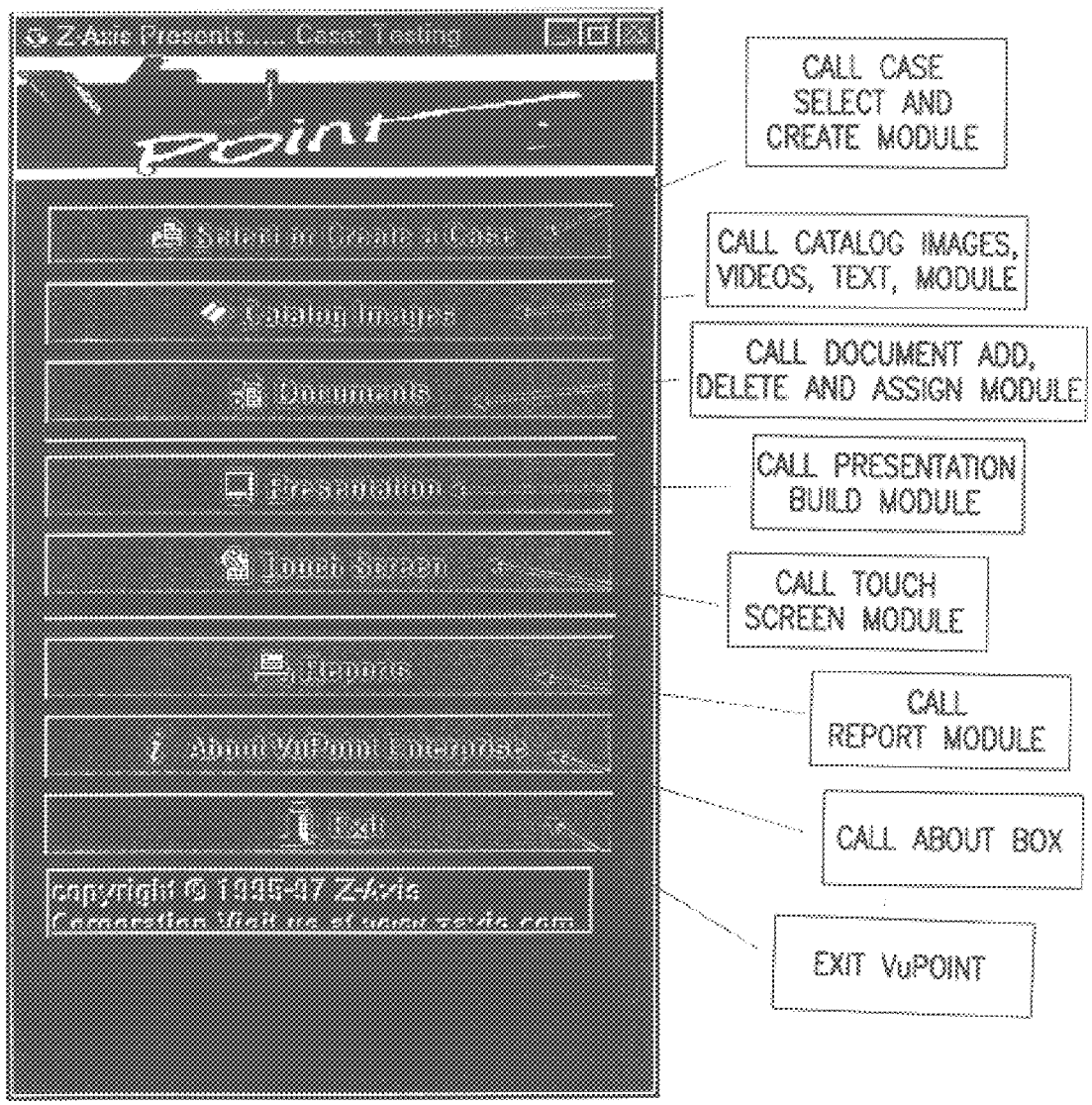
FIG. 3 shows the main menu screen of the VuPoint® embodiment of the present invention.

FIG. 3 illustrates the main menu screen of the VuPoint® embodiment. Using the main menu, any one of the following software modules can be selected:

(1) Select or Create a Case;

(2) Catalog Images;

(3) Documents;

(4) Presentation;

(5) Touch Screen;

(6) Reports;

(7) About VuPoint® Enterprise; and (8) Exit.

These modules are described in more detail below.

Modules 1, 2 and 3 of the system provide an underlying information unit management system and module 4 provides an interface for optionally enhancing information units and creating, storing and displaying presentations of the information units and their enhancements. These presentations may be electronically imported or exported between systems or may be exported to be viewed by individuals on a computer which does not have the VuPoint® software system on it. In addition, the system enables the user to create and display presentations "on-the-fly" without having to create or store them in advance. Presentations may also be printed on paper.

Figure 4:
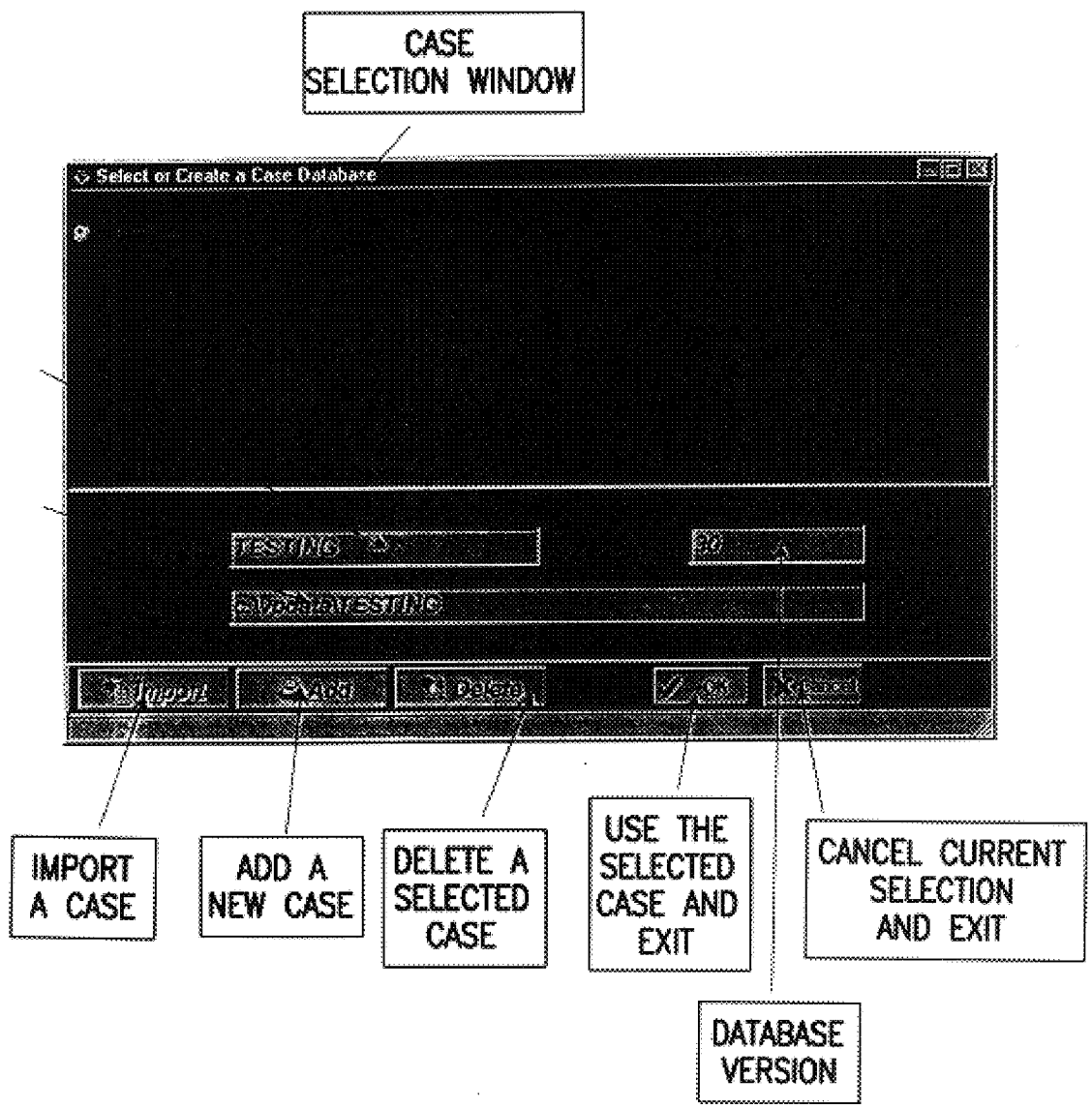
FIG. 4 shows the select or create database screen of the VuPoint® embodiment of the present invention.
Figure 5:
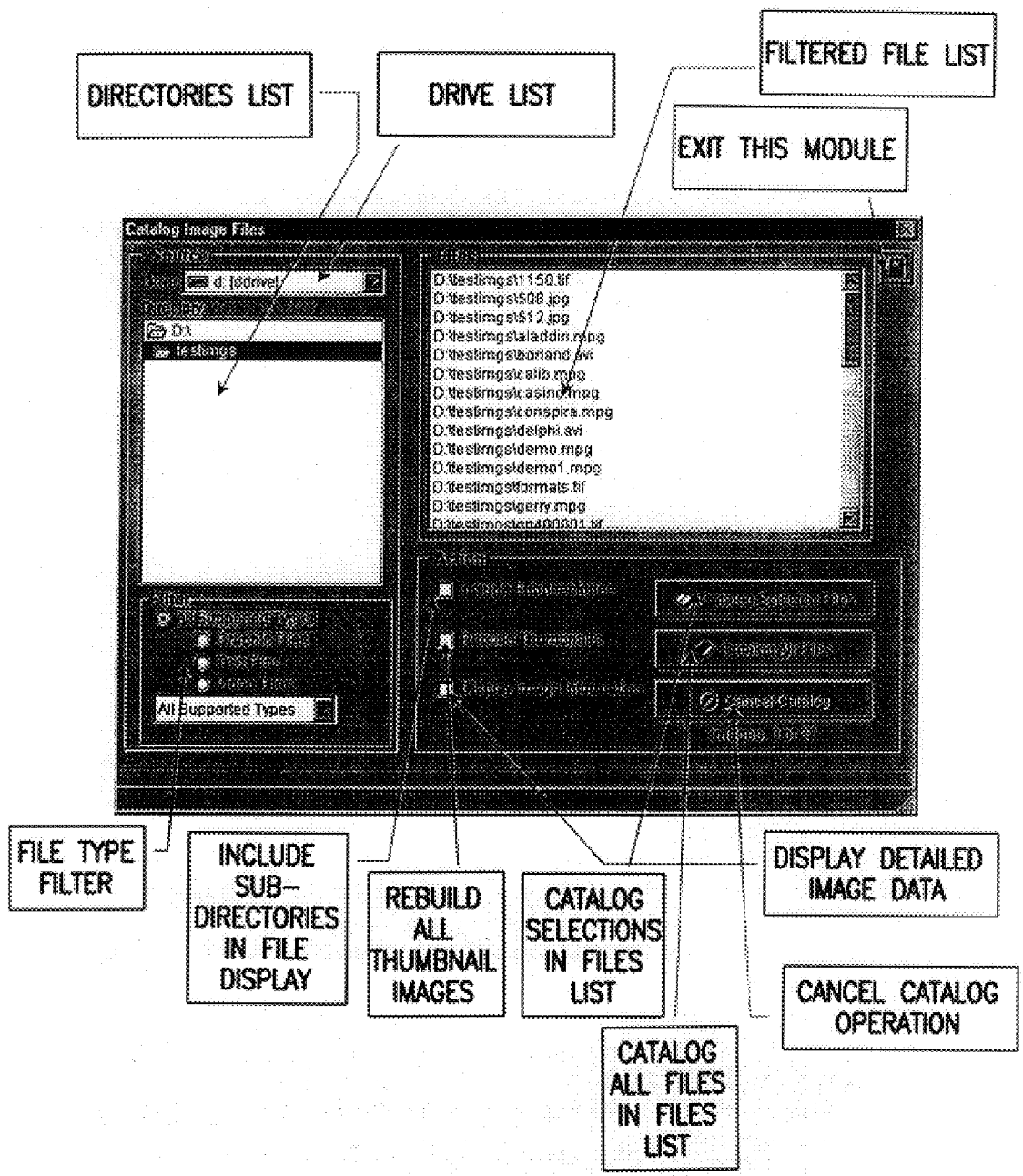
FIG. 5 shows the catalog image files screen of the VuPoint® embodiment of the present invention.
Figure 6:
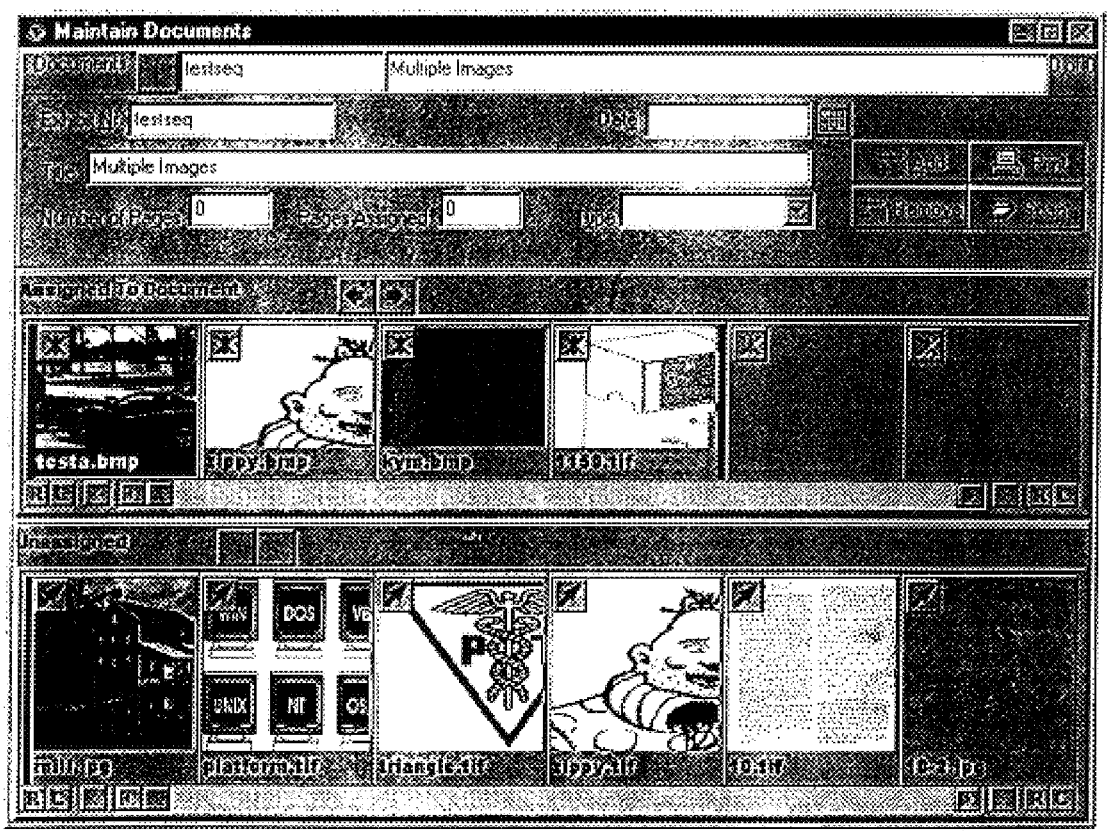
FIG. 6 shows the maintain documents screen of the VuPoint® embodiment of the present invention.

As shown in FIGS. 4, 5 and 6, the VuPoint® embodiment allows for the creation or selection of a "case database", and the cataloging of information units into cases. The management component of the system of the invention provides methods and tools which allow the user to catalog the information units. Descriptions can be assigned to each information unit. Information units may be grouped into what is termed herein as a document. A document may refer to any group of information units, e.g., all of the pages of a contract, a series of photographs, or several related videos. A document may also refer to different types of information units, e.g., the pages of an article and all of its photographs or a video and its text transcription. Descriptions can be assigned to each document. Related documents may be associated under user-specified "topics." In a legal setting, related units may also be associated under user-specified "witnesses." Various status conditions can be assigned to information units (e.g., assigned or unassigned to a document, exclude from display, duplicate, etc.). The system of the invention allows the user to assign attributes (such as rotation, zoom level, image origin) to certain types of units, which become permanent features of the image. In addition, users may add certain enhancements to the images (highlights, graphics, redactions, and text are but some of the choices) which become permanent features of the image and are thus included whenever that image is added to a presentation.

Figure 8:
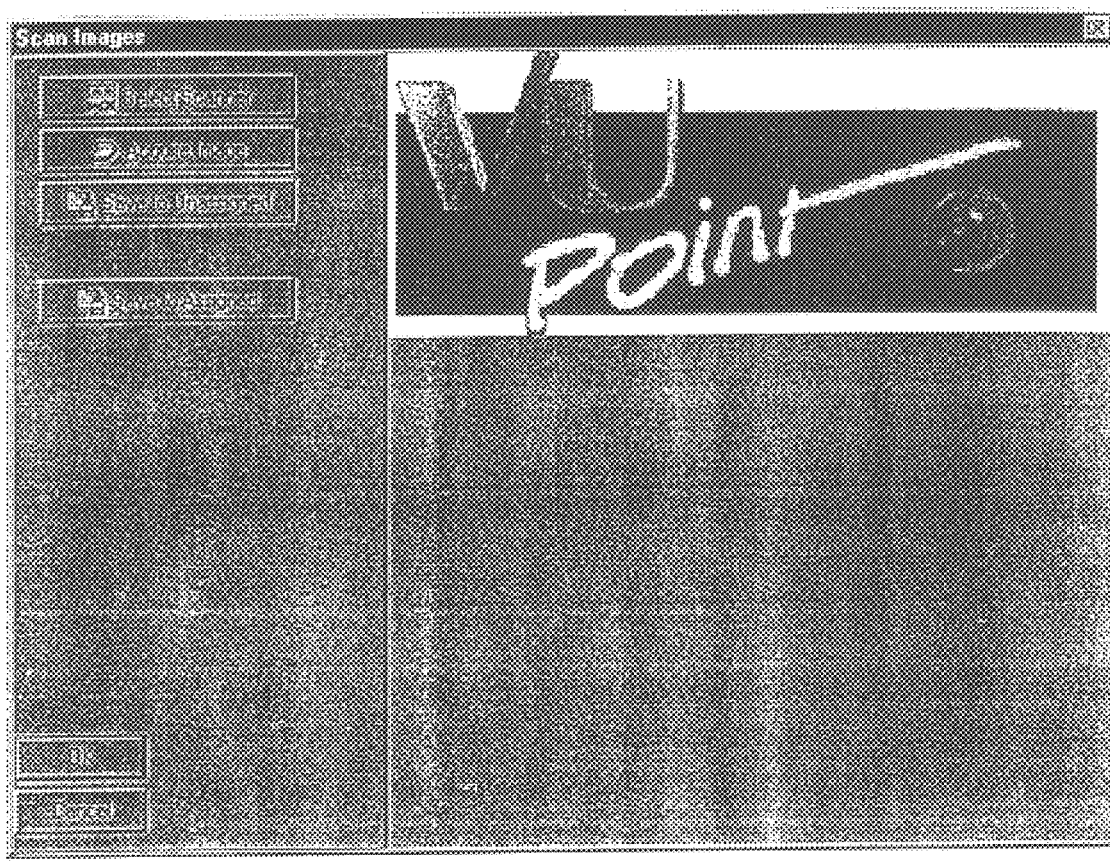
FIG. 8 shows the scan images screen of the VuPoint® embodiment of the present invention.

Preferably, information units in the form of files are first cataloged (FIG. 5) in the system, which essentially is indexing the files for retrieval and manipulation by the other modules of the VuPoint® system. These information units can then be assigned to documents (FIG. 6), so that each document has one or more information units. As shown in FIG. 6, the information units can be displayed in thumbnail or other form (or played if video or audio) in a row on the lower part of a screen. These are then selected to be added to a document, and additional data regarding the information unit can be associated therewith, like a name of the information unit. FIG. 8 is the screen display corresponding to the image scanning function of the VuPoint® embodiment of the invention. Using this function, images can be added to the database in the form of files to be cataloged.

Figure 7:
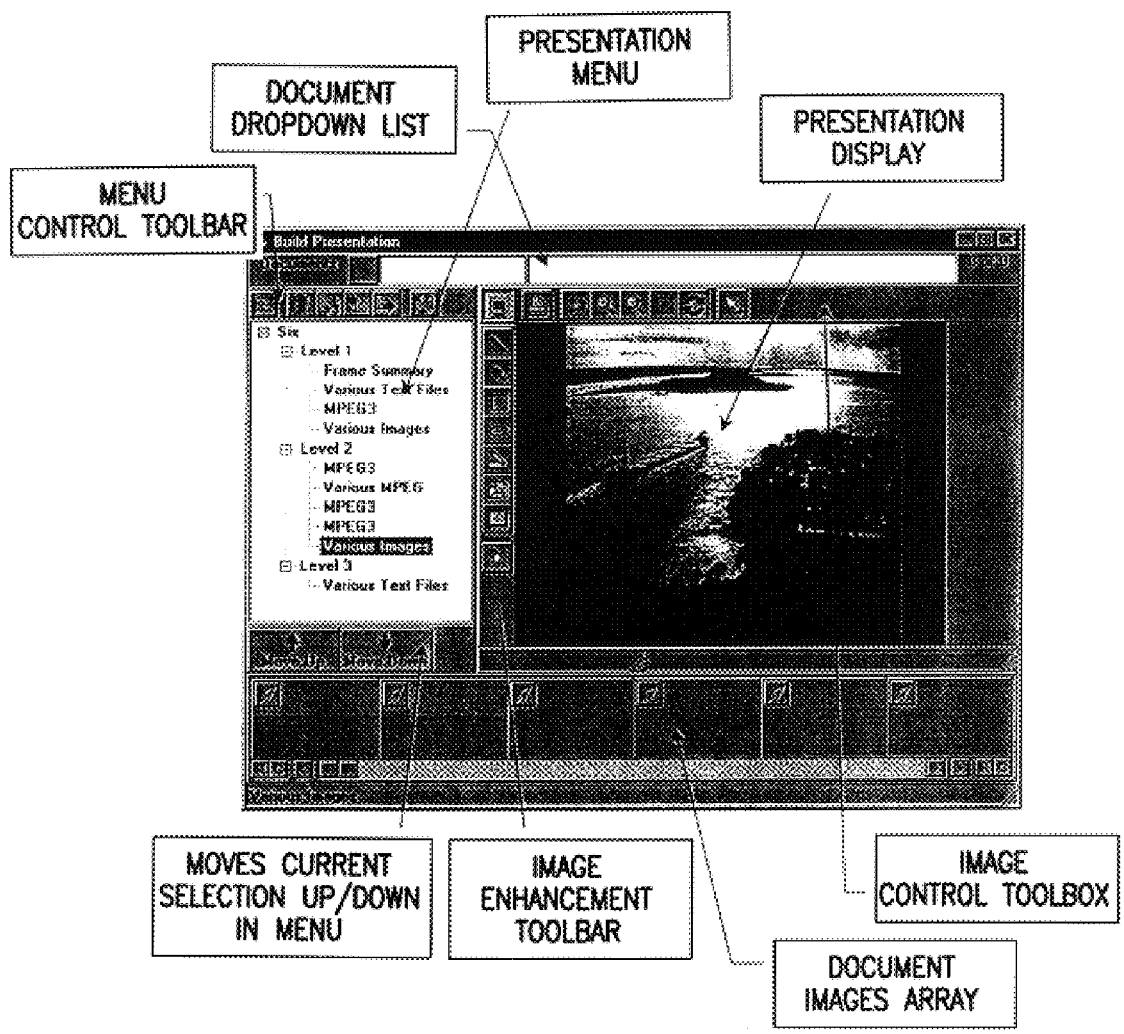
FIG. 7 shows the build presentation screen of the VuPoint® embodiment of the present invention.

The presentation module 4 of VuPoint® allows the user to create one or more independent presentations of information units selected from documents. The user may segment the presentation into user-defined sections, or subjects, (in the example screen display shown in FIG. 7, sections, or subjects, are denoted as Level 1, Level 2 and Level 3) and quickly add information units in any desired sequence to any section, or subject. The words "level 1," "level 2," and "level 3" in this instance are merely names of subjects and do not connotate different levels of hierarchy as described otherwise herein. Each information unit within a presentation may be optionally modified. The modification of still images may include changing attributes or adding enhancements. With video, modification may include selecting different beginning and ending points, running at different speeds, running backwards or adding enhancements. With text files, modification may include selecting beginning and ending points, assigning attributes or adding enhancements. With audio, modification may include selecting different beginning and ending points, adding text transcription, excerpts or other visuals to the visual display while the audio is playing and assigning attributes or enhancing those visuals. The same information unit may be used in multiple instances with different attributes or enhancements. The attributes and enhancements used with a specific information unit in one instance are only associated with that information unit in that specific instance, although they may be copied and pasted to other information units or to other instances of that information unit. The screen for the presentation module is shown in FIG. 7.

When operating with multiple computers networked together, the system of the invention allows one or more computers to be control systems and one or more computers to be remote display systems, as generally illustrated in FIGS. 1 and 2. The control systems run software that allows users to control what actions are performed by the remote display systems, using the touch screen module 5. The remote display systems run software that allows them to receive information from the control systems instructing them what actions to perform. Each remote display system may be separately instructed to perform different actions, thus, for example, different images may be displayed on each remote display system. The control systems may also view different information units than the remote display systems. For example, this allows the control systems to display selection menus, information about the presentation, control buttons or enhancement buttons in addition to information units while the remote display systems are only showing information units to the audience. This also enables the user to navigate around the presentation, change presentations, and preview different information units on a control system while the remote display systems continue to show the previous display.

The screen display illustrated in FIG. 9 provides the user interface at the control display used to control the display of images. The right side of the screen provides a display area for previewing information units to be displayed to the judge or jury. Information units may be selected for viewing in the display area from the list of information units (images in this example) that are listed in the form of raised button bars on the left side of the screen display. An arrow (preferably green) is overlaid on top of the button bar representing the image that is currently on display in the display area. If desired, the system can be programmed so that information units selected from the list of information units on the left side can be automatically presented or displayed on the audience's display devices simultaneously with being presented in the display area of the control screen. The prior and next buttons on the bottom of the screen on the left allow the presenter to scroll up or down a list of information units that could be selected for viewing.

A "jury" button on the top right half of the screen allows that when it is highlighted the image in the display area is also displayed for the "jury" audience, which in the example of a courtroom setting would be accomplished by a display device positioned in front of the jury. An additional separate button for a "judge" or other audience can also be provided and used to control the display of the selected image to the judge or other audience independently of the display to the jury. A subject button provides that a particular presentation can be selected for viewing, so that the information units assigned to that presentation are then listed in the left hand column.

This capability may be extremely valuable, for example, in a legal setting. An attorney may display an image to a jury on a remote display system. In advance of displaying the next image to the jury, the judge may wish to review it. The attorney with the control system can display the next image to the judge on another remote display system while the jury is still looking at the first image. In addition, the attorney may preview other images on the control system or change presentations at the same time while not disturbing the judge or jury displays. When the judge allows the attorney to display the second image to the jury, it may be done immediately. In one embodiment, in which the control system monitor is a touch screen, the attorney may accomplish this merely by touching one button on the monitor. Furthermore, the attorney may have buttons on the control console which serve as enhancement tools. The jury and judge viewing remote display systems will never see these buttons.

In addition to allowing for more than one remote display system, the invention allows for more than one control system so that what is displayed on remote display systems may be controlled by more than one user. Each remote display system will respond to the last command sent by a user. This embodiment is illustrated in FIG. 2, which shows two touch screen input devices to the control computer.

Another embodiment of the invention enables a message to be sent between computers when multiple computers are networked together. In a business presentation setting, for example, a presenter operating a control console would be able to receive messages from associates during a live presentation that may provide further information to assist the presenter. These messages would only appear on the control system and the audience viewing the remote display system would remain undisturbed by and unaware of that communication.

The system of the invention also provides a reporting subsystem. The system may report on the information units, the organization of the information or the sequences of information units in presentations. This system may also print out images with their attributes and enhancements. At the user's discretion, a date and time stamp, denoting when any information unit was presented, may be stored and reported. This is particularly useful in a legal application in which it may be valuable to know which items were shown in court and when they were shown.

Program Modules

Described below are the software modules of the VuPoint® embodiment of the invention represented in the microfiche appendix.

Amain: This the main menu. If a default Case is present (one previously opened) this module opens it. The user then has a series of options to continue using the VuPoint system. This module manages most of the main level navigation among the various VuPoint Modules. When the user requests an Exit, the module saves all outstanding data requests, closes all open databases and releases system resources.

Create: This module manages case creation and removal. It creates new case database files and adds the case to the system database files. The user is prompted for a Case Name, a Case identification and optionally, a subdirectory location. This module also deletes existing case database files and removes cases from the system database files. It can also import a case database file from other computers and/or directories.

Catalog: This module creates a database of information units. It allows the user to specify the source for the information units to be used in the current case. This source can be any mounted or mountable device that can be read by the operating system. The file is read, its validity determined and its reference information added to the case database files. This module then creates a thumbnail image of the image file or creates a system standard thumbnail for a video, text or audio file. Using this module, the system standard thumbnail for video, text and audio files can be replaced later by selections made by the user.

Documents: This module creates documents, assigns information units; and scans new images. The user is prompted for the necessary fields required to identify the document, as well as various optional fields.

The module also maintains case links to the document records and the information units. The user can view all of the information units not currently assigned to a document as well as those already assigned. This module can also scan new images to a selected document. This assumes a compliant scanning device is attached to the computer. Images can also be assigned to the unassigned document list. This module can also select new thumbnail images for video, text and audio files. The user has the option of selecting a representative video frame or a group of text lines to be used as the thumbnail image.

Category: This module defines and assigns documents to user defined categories. It is used in the presentation to delineate and limit the volume of data selected for inclusion. This module also defines new category types. The user is prompted for the required data fields. The module can also add and delete fields within categories. The user is prompted for the required data fields and data types. The module also maintains links between the category records and the document records. The user is presented with a list of documents and may select one or more to be linked to a category.

Presentation: This module builds and maintains presentations. The presentation is maintained as a hierarchical menu comprised of the presentation level, the subject level and the information unit level. The user first adds a presentation level, or presentation, providing a title. The system creates a short identification code which the user has the option of changing during the creation phase. The user can then add one or more subject levels, also referred to as subjects to the presentation. A subject may be added, moved, renamed or removed later as the presentation building progresses. The user is prompted for the new subject level title. The next step is to assign information units to the presentation through the documents entered earlier. The user can call up the information units assigned to a specific document and by clicking on a selection button can cause the information unit to be inserted into the subject on the presentation menu at the selected position. The group of documents available for assignment can be delineated through the application of the category links defined in the category module. After an information unit has been added to the subject of the presentation, the user can add symbol or text annotations to the unit, zoom or rotate the image, designate specific play sequences on video and audio units, and control an on-screen pointer. This module can also designate specific display areas on image and text data, and edit the text data. Using this procedure, the user can design courtroom presentations very quickly. The presentation module requires the user to manually connect to the remote presentation computer based on rules defined in the options module. Once connected, the user can effect changes to the display by changing the display unit view port in the presentation module. Changes made here are instantly communicated to the VuPoint® remote presentation system for display to the audience so that information units and changes may be instantly displayed to the audience. In a legal setting, a judge has the optional capability of having a separate touch panel that can turn the jury display system on and off.

TouchScreen: This module shows a presentation prepared in the presentation module. It was designed for use with a touch screen but can also be run as a normal windows screen, for example, as used with a mouse. By touching (or clicking) one of the visible buttons the presenter goes down to the next lower level of data in the menu hierarchy. For example: touching a presentation button will display the buttons for each of the subject areas, also referred to herein as subjects, under that presentation. Touching one of the subject buttons will cause the system to display the buttons for the information units placed in the presentation during the presentation build phase. The user has some of the same tools as are available in the presentation module. However, the following differences apply: 1) no new information unit can be added; 2) no existing information unit can be removed; 3) no text annotation can be placed over a information unit; and 4) annotations added during the presentation build phase cannot be removed. This module initializes assuming a connection to the remote presentation computer based on rules defined in the options module so that, for example, information units may be instantly displayed to the audience. Once connected, the user can effect changes to the display by changing the display unit view port in the presentation module. Changes made here are instantly communicated to the VuPoint® remote presentation system for display to the audience.

Reports: This module prints information. It presents the user with a series of choices to create and print the pre-defined system reports. These reports currently consist of document content reports. New reports are added as they are defined and programmed.

Options: This is the system options module. It allows the user to define various parameters required by the system such as setting the data subdirectory, defining import/export rules, and defining the connection to the remote presentation computers.

Remote Presentation: This module shows a presentation. The remote presentation system is a stand-alone program designed to operate on instructions from the VuPoint program concerning display and blanking of the display devices. When the presenter touches an onscreen button in the touch screen module, VuPoint communicates this action to the remote presentation system over the local area network and the remote presentation system performs the action. This action may be to blank the screen, or to display a (possibly enhanced) information unit. The remote presentation system then goes idle and awaits further instructions from the VuPoint system. In a legal setting, the judge has the optional capability of having a separate touch panel that can turn the jury display system on and off. The remote presentation system can recognize the judge configuration and adjust its display to provide a touch button for this purpose. When the display is turned back on by the judge, the control system initiates a re-show before it is actually presented to the jury.

Message: This is a stand-alone program designed to operate on instructions from the VuPoint program concerning the routing of messages over the LAN. This module provides the various computers, connected to the LAN, the capability to share electronic mail with each other and coordinate structured responses. This facility provides a transparent communication channel linked to the presentation and touch screen modules. The presentation touch panel has no keyboarding capability but has instead been provided with a quick response touch button capability.

Database Tables and Fields

The tables and fields within those tables used with the VuPoint™ embodiment of the invention are set forth below.

Figure 10:
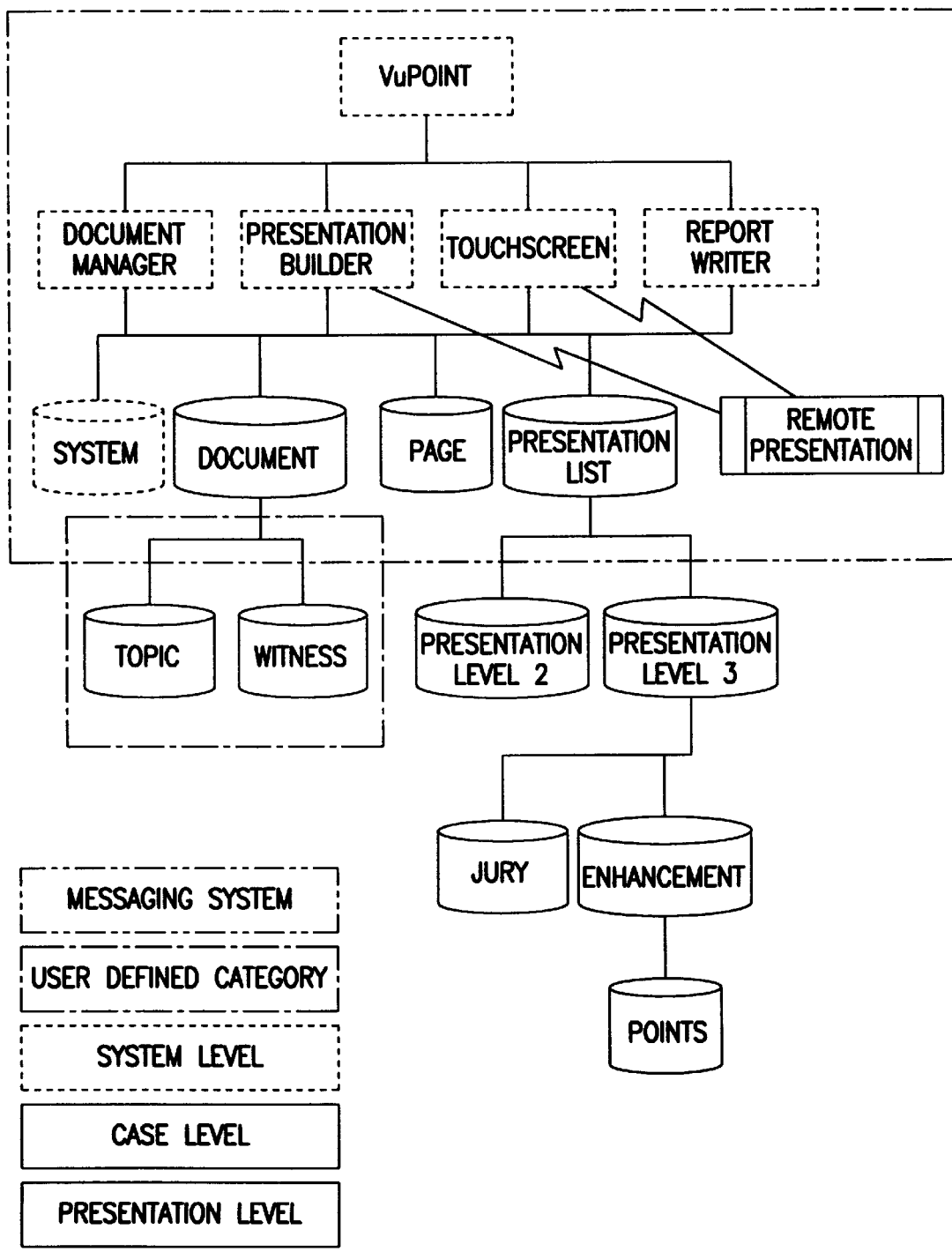
FIG. 10 shows an overview of the database relationships of the VuPoint® embodiment of the present invention.

The interrelationship of these tables is illustrated in FIG. 10.

Directory

| | |
|---|---|
| Seq | AUTOINC |
| VolumeID | INTEGER |
| Directory | CHARACTER |

Document

| | |
|---|---|
| DocumentID | AUTOINC |
| Exhibit | CHARACTER |
| DocumentType | CHARACTER |
| DocumentDate | CHARACTER |
| Title | CHARACTER |
| PageCount | INTEGER |
| PagesAssigned | INTEGER |
| Category | (User defined) |

| | |
|---|---|
| CategoryID | INTEGER |
| CategoryType | INTEGER |
| Field1 | CHARACTER |
| . . . | |
| Fieldn | CHARACTER |

Page

| | |
|---|---|
| PageID | AUTOINC |
| DirID | INTEGER |
| FileName | CHARACTER |
| DocID | INTEGER |
| VolID | INTEGER |
| Title | CHARACTER |
| ObjectType | CHARACTER |
| ImageNr | INTEGER |
| FlagAssigned | BOOLEAN |
| FlagExcluded | BOOLEAN |
| FlagTitleChanged | BOOLEAN |
| Rotation | INTEGER |
| Zoom | INTEGER |
| Xpos | INTEGER |
| Ypos | INTEGER |
| Xsize | INTEGER |
| Ysize | INTEGER |
| Status | INTEGER |

Presentation Level 2

| | |
|---|---|
| MenuLevel | INTEGER |
| Generation | INTEGER |
| Title | CHARACTER |

Presentation Level 3

| | |
|---|---|
| DisplayLevel | INTEGER |
| Generation | INTEGER |
| OrientKey | AUTOINC |
| ParentLevel | INTEGER |
| PageID | INTEGER |
| Title | CHARACTER |
| Rotation | INTEGER |
| Zoom | INTEGER |
| Xpos | INTEGER |
| Ypos | INTEGER |
| Xsize | INTEGER |
| Ysize | INTEGER |

Presentation List

| | |
|---|---|
| CaseID | CHARACTER |
| Status | BOOLEAN |
| LongName | CHARACTER |
| Path | CHARACTER |
| ThumbNail | |

| | |
|---|---|
| PageID | INTEGER |
| Ratio | INTEGER |
| ThumbNail | IMAGE |

Volume

| | |
|---|---|
| Seq | AUTOINC |
| VolumeID | CHARACTER |
| Title | CHARACTER |

-continued

| Points | |
|---|---|
| PresKey | INTEGER |
| ObjectID | INTEGER |
| PointNr | INTEGER |
| PointX | INTEGER |
| PointY | INTEGER |
| Enhance | |
| DisplayLevel | INTEGER |
| ObjectID | INTEGER |
| ObjectType | INTEGER |
| Layer | INTEGER |
| DefiningRectLeft | INTEGER |
| DefiningRectTop | INTEGER |
| DefiningRectRight | INTEGER |
| DefiningRectBottom | INTEGER |
| LineSize | INTEGER |
| CornerSize | INTEGER |
| BackgroundColor | INTEGER |
| ForegroundColor | INTEGER |
| Opacity | INTEGER |
| FrameStyle | INTEGER |
| DropShadow | BOOLEAN |
| Orientation | INTEGER |
| FontName | CHARACTER |
| FontSize | INTEGER |
| FontStyle | INTEGER |

Thus, there has been described above a system for organizing and presenting information to an audience. While described with respect to a courtroom setting, the invention is readily applicable to other settings.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of presenting a set of information units comprising the steps of:

A) providing a first presentation unit positioned to be viewed by a person controlling the presentation of information units on a second presentation unit, B) positioning the second presentation unit to be viewed by an audience;

C) presenting on the first presentation unit a first information unit from the set which is a candidate to be presented on the second presentation unit and if desired selecting it to be presented on the second presentation unit;

D) presenting the first information unit on the second presentation unit if it is selected for presentation;

E) while presenting the first information unit on the second presentation unit, presenting on the first presentation unit a second information unit from the set which is a candidate to be presented on the second presentation unit and if desired selecting it to be presented on the second presentation unit;

F) presenting the second information unit on the second presentation unit if it is selected for presentation, wherein the first information unit is replaced by the second information unit;

G) controlling the presentation of information units on the first and second presentation units using one or more computers;

H) grouping information units into sets, and displaying on the first presentation unit a list of names of the information units that can be accessed and displayed; and I) selectively displaying only those names of sets that are desired for access during a given time period so that the names of sets that are not desired for access during the given time period are hidden from view.

2. A method of presenting a set of information units comprising the steps of:

A) providing a first presentation unit positioned to be viewed by a person controlling the presentation of information units on a second presentation unit, B) positioning the second presentation unit to be viewed by an audience;

C) presenting on the first presentation unit a first information unit from the set which is a candidate to be presented on the second presentation unit and if desired selecting it to be presented on the second presentation unit;

D) presenting the first information unit on the second presentation unit if it is selected for presentation;

E) while presenting the first information unit on the second presentation unit, presenting on the first presentation unit a second information unit from the set which is a candidate to be presented on the second presentation unit and if desired selecting it to be presented on the second presentation unit;

F) presenting the second information unit on the second presentation unit if it is selected for presentation, wherein the first information unit is replaced by the second information unit;

G) controlling the presentation of information units on the first and second presentation units using one or more computers; and H) displaying information unit names with one or more special visual indicators displayed in conjunction therewith so that certain attributes of the information units can be flagged.

3. A method of presenting a set of information units comprising the steps of:

A) forming a set by a method comprising the steps of:
 1) displaying on a presentation unit used to build a set a list of names of information units that are candidates to be included in a presentation;
 2) displaying a thumbnail information unit which reference one of the information units simultaneously on the display;
 3) selecting one of the thumbnail information units to be included in the set; and
 4) adding the selected thumbnail information unit to a list of names of selected information units forming the set and displaying the list of names in the set while the thumbnail information units and the list of names of candidate information units are all simultaneously displayed;

B) providing a first presentation unit positioned to be viewed by a person controlling the presentation of information units on a second presentation unit, C) positioning the second presentation unit to be viewed by an audience;

D) presenting on the first presentation unit a first information unit from the set which is a candidate to be presented on the second presentation unit and if desired selecting it to be presented on the second presentation unit;

E) presenting the first informnation unit on the second presentation unit if it is selected for presentation;

F) while presenting the first information unit on the second presentation unit, presenting on the first presentation unit a second information unit from the set which is a candidate to be presented on the second presentation unit and if desired selecting it to be presented on the second presentation unit;

G) presenting the second information unit on the second presentation unit if it is selected for presentation, wherein the first information unit is replaced by the second information unit; and H) controlling the presentation of information units on the first and second presentation units using one or more computers.

4. A method according to claim 3 further including the step of enhancing or changing the attributes of the information units in a set and making the enhancements or edits a permanent part of the information unit.

* * * * *